US011325680B2

(12) United States Patent
Martin

(10) Patent No.: US 11,325,680 B2
(45) Date of Patent: *May 10, 2022

(54) ADJUSTABLE BUOYANCY FOIL

(71) Applicant: GX Technology Canada LTD., Calgary (CA)

(72) Inventor: Daniel George Martin, Woodstock (CA)

(73) Assignee: GX TECHNOLOGY CANADA LTD., Calgary (CA)

( * ) Notice: Subject to any disclaimer, the term of this patent is extended or adjusted under 35 U.S.C. 154(b) by 100 days.

This patent is subject to a terminal disclaimer.

(21) Appl. No.: 16/659,269

(22) Filed: Oct. 21, 2019

(65) Prior Publication Data
US 2020/0047854 A1 Feb. 13, 2020

Related U.S. Application Data

(63) Continuation of application No. 15/435,057, filed on Feb. 16, 2017, now Pat. No. 10,507,893.
(Continued)

(51) Int. Cl.
B63B 21/66 (2006.01)
G01V 1/38 (2006.01)
B63G 8/42 (2006.01)

(52) U.S. Cl.
CPC ............ B63B 21/66 (2013.01); B63B 21/663 (2013.01); B63G 8/42 (2013.01); G01V 1/3826 (2013.01)

(58) Field of Classification Search
CPC .... B63B 21/66; B63B 21/663; G01V 1/3826; B63G 8/42
(Continued)

(56) References Cited

U.S. PATENT DOCUMENTS 2,435,956 A 2/1948 Craig
2,523,925 A 9/1950 Sorensen
(Continued)

FOREIGN PATENT DOCUMENTS

CN 1355750 A 6/2002
CN 1954239 A 4/2007
(Continued)

OTHER PUBLICATIONS

Danish Patent and Tradmark Office 2nd Technical Examination for Application No. PA 2018 70583 dated Oct. 21, 2020.
(Continued)

Primary Examiner — Daniel L Murphy
(74) Attorney, Agent, or Firm — Patterson + Sheridan, LLP

(57) ABSTRACT

A foil for a towed cable includes a body defining at least two conduits. The body has a foil shape having a leading edge and a trailing edge. The foil shape defines a first surface extending between the leading edge and the trailing edge configured to provide lift. The foil shape defines a second surface opposed to the first surface extending between the leading edge and the trailing edge. The foil shape defines first and second lateral sides that extend between respective lateral edges of the first and second surfaces, the leading edge, and the trailing edge. A first conduit is defined within the forward half of the body adjacent to the leading edge, is open to each of the first and second lateral sides, and is configured to receive a cable therethrough. A second conduit may be defined within the body and filled with buoyant material.

20 Claims, 16 Drawing Sheets

Related U.S. Application Data

(60) Provisional application No. 62/295,561, filed on Feb. 16, 2016.

(58) Field of Classification Search
USPC .......................................................... 367/17
See application file for complete search history.

(56) References Cited

U.S. PATENT DOCUMENTS

| | | | |
|---|---|---|---|
| 2,914,878 A | 12/1959 | Sterner et al. | |
| 3,943,483 A | 3/1976 | Strange | |
| 4,180,935 A | 1/1980 | Goudey et al. | |
| 4,365,574 A | 12/1982 | Norminton | |
| 4,404,664 A | 9/1983 | Zachariadis | |
| 4,484,534 A | 11/1984 | Thillaye due Boullay | |
| 4,514,924 A | 5/1985 | Ojserkis et al. | |
| 4,567,841 A | 2/1986 | Hale | |
| 4,823,325 A | 4/1989 | Cole, Jr. | |
| 4,829,929 A | 5/1989 | Kerfoot | |
| 5,444,933 A | 8/1995 | Kinoshita et al. | |
| 6,016,286 A | 1/2000 | Olivier et al. | |
| 6,131,327 A | 10/2000 | Larsen | |
| 6,144,342 A | 11/2000 | Bertheas et al. | |
| 6,189,475 B1 | 2/2001 | Coakley | |
| 6,226,225 B1 | 5/2001 | Barker et al. | |
| 6,453,597 B1 | 9/2002 | Kirkpatrick | |
| 6,504,792 B2 | 1/2003 | Barker et al. | |
| 6,532,189 B2 | 3/2003 | Barker | |
| 6,655,311 B1 | 12/2003 | Martin et al. | |
| 6,671,223 B2 | 12/2003 | Bittleston | |
| 6,691,038 B2 | 2/2004 | Zajac et al. | |
| 6,837,175 B1 | 1/2005 | Gieseke | |
| 6,932,017 B1 | 8/2005 | Bittleston et al. | |
| 7,080,607 B2 | 7/2006 | Bittleston et al. | |
| 7,162,967 B2 | 1/2007 | Bittleston et al. | |
| 7,222,579 B2 | 5/2007 | Bittleston et al. | |
| 7,293,520 B2 | 11/2007 | Bittleston et al. | |
| 7,380,513 B2 | 6/2008 | Lie | |
| 7,404,370 B2 | 7/2008 | Stokkeland | |
| 7,499,373 B2 | 3/2009 | Toennessen | |
| 7,577,060 B2 | 8/2009 | Toennessen et al. | |
| 7,738,317 B2 | 6/2010 | Toennessen | |
| 7,755,970 B2 | 7/2010 | Welker et al. | |
| 7,793,606 B2 | 9/2010 | Olivier et al. | |
| 8,226,328 B2 | 7/2012 | Thompson et al. | |
| 8,230,801 B2 | 7/2012 | Bittleston et al. | |
| 8,391,101 B2 | 3/2013 | Brewer et al. | |
| 8,391,102 B2 | 3/2013 | Holo et al. | |
| 8,593,905 B2 | 11/2013 | Gagliardi et al. | |
| 8,743,655 B2 | 6/2014 | Bittleston et al. | |
| 8,897,094 B2 | 11/2014 | Brewer et al. | |
| 8,997,675 B2 | 4/2015 | MacQuin et al. | |
| 9,075,165 B2 | 7/2015 | Vageskar et al. | |
| 9,151,859 B2 | 10/2015 | Martin | |
| 9,211,940 B2 | 12/2015 | Richer De Forges | |
| 9,221,524 B2 | 12/2015 | Richer De Forges | |
| 9,244,184 B2 | 1/2016 | Voldsbekk | |
| 9,244,187 B2 | 1/2016 | Berentzen et al. | |
| 9,494,703 B2 | 11/2016 | Mork et al. | |
| 9,581,714 B2 | 2/2017 | Barral et al. | |
| 9,632,195 B2 | 4/2017 | Martin | |
| 9,676,454 B2 | 6/2017 | Simonnot et al. | |
| 9,791,582 B2* | 10/2017 | Martin | B63B 21/663 |
| 9,880,308 B2 | 1/2018 | Steinsland et al. | |
| 10,507,893 B2* | 12/2019 | Martin | B63B 21/66 |
| 2006/0176775 A1 | 8/2006 | Toennessen | |
| 2008/0029012 A1 | 2/2008 | Stokkeland | |
| 2009/0003129 A1 | 1/2009 | Stokkeland et al. | |
| 2010/0149910 A1 | 6/2010 | Martin | |
| 2010/0226204 A1 | 9/2010 | Gagliardi et al. | |
| 2011/0103179 A1 | 5/2011 | Vageskar et al. | |
| 2011/0203509 A1 | 8/2011 | Austad et al. | |
| 2012/0067265 A1 | 3/2012 | Valø | |
| 2013/0088937 A1 | 4/2013 | Sykes | |
| 2013/0182531 A1 | 7/2013 | Gagliardi et al. | |
| 2014/0104985 A1 | 4/2014 | Gagliardi et al. | |
| 2014/0140169 A1 | 5/2014 | Cambois et al. | |
| 2014/0247691 A1 | 9/2014 | Martin | |
| 2014/0247692 A1 | 9/2014 | Simonnot | |
| 2014/0269174 A1 | 9/2014 | Gagliardi et al. | |
| 2015/0174848 A1 | 6/2015 | Padros | |
| 2015/0268366 A1 | 9/2015 | Vågeskar et al. | |
| 2015/0272094 A1 | 10/2015 | Pearlman | |
| 2016/0067265 A1 | 3/2016 | Nemeth et al. | |
| 2016/0161622 A1 | 6/2016 | Martin | |
| 2017/0106946 A1 | 4/2017 | Schneider | |
| 2017/0184749 A1 | 6/2017 | McKey, III et al. | |
| 2017/0199293 A1 | 7/2017 | Marshall et al. | |
| 2017/0233040 A1 | 8/2017 | Martin | |
| 2018/0027784 A1 | 2/2018 | Martin | |
| 2020/0108898 A1 | 4/2020 | Martin | |
| 2021/0197929 A1* | 7/2021 | Martin | B63B 1/26 |

FOREIGN PATENT DOCUMENTS

| | | |
|---|---|---|
| CN | 102103214 A | 6/2011 |
| CN | 102405419 A | 4/2012 |
| CN | 102483464 A | 5/2012 |
| CN | 103129414 A | 6/2013 |
| DE | 3933398 A1 | 4/1991 |
| EA | 021094 B1 | 4/2015 |
| EP | 0884607 A2 | 12/1998 |
| EP | 2317341 A2 | 5/2011 |
| EP | 2370838 A1 | 10/2011 |
| EP | 2776863 B1 | 2/2015 |
| ES | 1018874 U | 2/1992 |
| GB | 108761 A | 8/1917 |
| GB | 282520 A | 12/1927 |
| GB | 682349 A | 11/1952 |
| GB | 693238 A | 6/1953 |
| GB | 2342081 A | 4/2000 |
| GB | 2400662 B | 10/2004 |
| GB | 2492642 A | 1/2013 |
| GB | 2492652 A | 1/2013 |
| JP | 32-2083 | 4/1957 |
| JP | 45-39013 | 12/1970 |
| JP | 3-76456 | 7/1991 |
| SU | 938755 A3 | 6/1982 |
| SU | 775974 A1 | 6/1987 |
| WO | 9516344 A1 | 6/1995 |
| WO | 9730361 A1 | 8/1997 |
| WO | 0076839 A1 | 12/2000 |
| WO | 2010111377 A2 | 9/2010 |
| WO | 2013059926 A1 | 5/2013 |
| WO | 2014003573 A2 | 1/2014 |
| WO | 2014145861 A1 | 9/2014 |
| WO | 2015174848 A1 | 11/2015 |
| WO | 2016086293 A1 | 6/2016 |
| WO | 2016127245 A1 | 8/2016 |

OTHER PUBLICATIONS

Office Action dated Feb. 26, 2020 in connection with Russian Patent Application No. 2018117668, 15 pages including English translation.
Extended European Search Report dated Oct. 9, 2018 in connection with European Patent Application No. 16748506.9, 11 pages.
First examination report dated Jul. 9, 2018 in connection with Danish Patent Application No. PA201770675, 5 pages.
Office Action dated Mar. 18, 2019 in connection with Danish Patent Application No. PA201870290, 5 pages.
Examination report dated Jul. 31, 2018 in connection with Canadian patent application No. 2,856,316, 4 pages.
Extended European Search Report dated Aug. 14, 2019 in connection with European Patent Application No. 17752738.9, 9 pages.
Office Action dated Aug. 20, 2019 in connection with Danish Patent Application No. PA201870290, 3 pages.
"Extended European Search Report for Application No. 12844247.2 (5 pages)", dated Sep. 16, 2015.
"International Preliminary Report on Patentability for Application No. PCT/CA2012/000996 (4 pages)", dated Apr. 29, 2014.

(56) References Cited

OTHER PUBLICATIONS

"International Search Report and Written Opinion for Application No. PCT/CA2012/000996 (6 pages)", dated May 2, 2013.
"Patent Examination Report No. 1 for Australian Application No. 2012327836 (2 pages)", dated Jun. 24, 2014.
International Search Report and Written Opinion dated Jan. 24, 2017 in connection with International Patent Application No. PCT/US2016/057344, 13 pages.
International Search Report and Written Opinion dated Jun. 23, 2017 in connection with International Patent Application No. PCT/IB2017/000209, 11 pages.
"The International Search Report and Written Opinion in connection with PCT/CA2015/000593 (7 pages)", dated Feb. 22, 2016.
"First Office Action dated Aug. 10, 2015 in connection with Danish Patent Application No. PA 2014 00278", dated Aug. 10, 2015, 7 pages.
"Second Office Action dated Mar. 1, 2016 in connection with Danish Patent Application No. PA 2014 00278", dated Mar. 1, 2016, 2 pages.
Office Action received for Chinese Patent Application No. 201680074025.3 dated Jan. 9, 2020, 18 pages including 12 pages of English translation.
Third Technical Examination received for Danish Patent Application No. PA 2017 70548, dated Jan. 10, 2020, 2 pages.
International Search Report and Written Opinion issued for PCT Application No. PCT/CA2019/051441, dated Jan. 14, 2020, 12 pages.
European Patent Office Extended European Search Report for Application No. 201941986.1015 dated Oct. 11, 2020.
Examination Report dated Nov. 2, 2018 in connection with Australian Patent Application No. 2015358314, 3 pages.
Office Action dated Nov. 26, 2019 in connection with Danish Patent Application No. PA201870583, 5 pages.
Office Action dated Nov. 26, 2019 in connection with JP Patent Application No. 2017-542383, 10 pages.
Office action dated Sep. 29, 2019, in connection with Chinese Patent Application No. 201780023806.4, 9 pages.
Second office action dated Aug. 16, 2019 in connection with Danish patent application No. PA201770548, 2 pages.

* cited by examiner

ADJUSTABLE BUOYANCY FOIL

CROSS REFERENCE TO RELATED APPLICATIONS

This application is a continuation of U.S. patent application Ser. No. 15/435,057 filed 16 Feb. 2017 entitled "Ribbon foil depressor," which further claims the benefit of priority of U.S. provisional application No. 62/295,561 filed 16 Feb. 2016 entitled "Ribbon-foil depressor," each of which is hereby incorporated herein by reference in its entirety.

TECHNICAL FIELD

The technology described herein relates to designs for fairings and foils attached to tow lines and cables for submerging sensor arrangements used in marine seismic exploration.

BACKGROUND

In towed marine seismic exploration, a hydrophone array is typically towed behind a marine vessel near the sea surface. The hydrophones are mounted to multiple sensor cables, commonly referred to as streamers. The streamers serve as platforms or carriers for the hydrophones, which are distributed along the length of each streamer in the array.

A set of seismic sources, also towed near the sea surface, are operated to periodically emit acoustic energy. The acoustic energy of interest propagates downward through the seawater (or other water column), penetrates the ocean floor, reflects from the subsea strata and other underlying structures, and returns upward through the water column to the hydrophone array.

The reflected seismic energy (or acoustic wave energy) arrives at receiver points in the towed hydrophone array. The array includes many such receiver points, distributed along each of the streamer cables, with sensors configured to generate data records characterizing the upward-traveling acoustic wavelets (or seismic waves) received from the subsurface structures beneath the seabed, at each of the receiver points. The hydrophone data recordings are later processed to generate seismic images of the underlying structure In the field of subsea seismic exploration, there has recently been a demand for seismic equipment operators to conduct their surveys with the seismic equipment submerged below the depths at which most seismic surveys have been conducted in the past. These new, deeper operating targets can now lie well below the depth of the surface-referenced equipment (i.e., the vessel and the paravanes) that is used to tow and laterally spread the seismic sensors.

Typical marine depressors for maintaining equipment at a substantially constant submerged depth tend to be fairly small with very poor aspect ratios thus resulting in low lift. Aspect ratio is defined as the span of the depressor divided by its chord line length. Wings with high aspect ratios generate high downward lift forces for minimal drag (such that lift-to-drag ratios as high as 10:1 or more are possible), whereas wings with aspect ratios as low as 1 or 2 (i.e., where span and chord are roughly the same scale) will typically have lift-to-drag ratios as low as 2:1, or even lower. Conventional depressors (see, e.g., Hydro Force Technologies AS "HFT Catfish 100" (<http://www.hft.no/catfish/>), or YSI Incorporated "V-Fin" (<https://www.ysi.com/File%20Library/Documents/Specification%20Sheets/E72-Standard-V-fins.pdf>) often also provide payload bays which can be used to hold additional ballast to supplement the downforce generated by the depressor.

The problem with using deadweight to generate downforce is that it does not scale with tow speed—it provides a constant downforce regardless of how fast the depressor is moving through the water. This is often disadvantageous for those applications where a range of operational speeds is expected, with the requirement that the towed equipment maintain a stable depth over that speed range. Consequently, there is no easy, economical, or ideal way to submerge and operate seismic equipment, such as towed streamer cables, at the desired lower depths.

The information included in this Background section of the specification, including any references cited herein and any description or discussion thereof, is included for technical reference purposes only and is not to be regarded subject matter by which the scope of the invention as defined in the claims is to be bound.

SUMMARY

To achieve the objective of submerging and operating seismic equipment at the desired depths (i.e., below the midpoint depth of the paravanes, for example), a specialized hydrofoil, or ribbon-foil depressor may be incorporated into the towed seismic array. The ribbon-foil depressors are preferably deployed on the port and starboard spur lines. Alternatively, the ribbon-foil depressors may be mounted on the outboard separation ropes. These ribbon-foil depressors may be used to submerge and operate seismic equipment at depths as low as 60 m or more and are capable of maintaining towed seismic streamer cables at these depths and still remain stable through various speed changes and turns.

One potential application is the depression of outboard streamer heads in seismic arrays, relative to the depth of the paravane crucifixes to which the spur lines are attached. In this application, the ribbon-foil depressors generate sufficient downforce to cause the spur line catenary to curve downward to the desired streamer depth, over the span of 10 to 100 meters, depending on the length of the spur lines used.

In one exemplary implementation, a foil for a towed cable includes a body defining at least three conduits. The body has a foil shape with a leading edge and a trailing edge. The foil shape defines a first surface extending between the leading edge and the trailing edge configured to provide lift. The foil shape defines a second surface opposed the first surface extending between the leading edge and the trailing edge. The foil shape also defines a first lateral side that extends between a first lateral edge of the first surface, a first lateral edge of the second surface, the leading edge, and the trailing edge. The foil shape further defines a second lateral side that extends between a second lateral edge of the first surface, a second lateral edge of the second surface, the leading edge, and the trailing edge. A first conduit is defined within the forward half of the body adjacent to the leading edge, is open to each of the first and second lateral sides, and is configured to receive a cable therethrough. A second conduit is defined within the forward half of the body aft of and parallel to the first conduit, is open to each of the first and second lateral sides, and is configured to receive a cable therethrough. A third conduit is defined within an aft half of the body.

In another exemplary implementation, a foil for a towed cable includes a body defining at least two conduits. The body has a foil shape having a leading edge and a trailing edge. The foil shape defines a first surface extending between the leading edge and the trailing edge configured to provide lift. The foil shape defines a second surface opposed to the first surface extending between the leading edge and the trailing edge. The foil shape also defines a first lateral side that extends between a first lateral edge of the first surface, a first lateral edge of the second surface, the leading edge, and the trailing edge. The foil shape further defines a second lateral side that extends between a second lateral edge of the first surface, a second lateral edge of the second surface, the leading edge, and the trailing edge. A first conduit is defined within the body, extends laterally within the body adjacent to the leading edge, is open to each of the first and second lateral sides, and is configured to receive a cable therethrough. A second conduit is defined within the body and is filled with buoyant material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

Seismic arrays with sources and streamers are used to study rock strata and other structures below the surface of the ocean or other bodies of water. One or more marine vessels are typically used to tow the source and/or receiver arrays, in order to obtain relevant geological data covering a desired surface area of the ocean floor. For example, a single surface vessel may simultaneously tow both a source array and an array of seismic streamers, or different vessels can be used to tow separate source and receiver arrays. Alternatively, a towed source array can be used in conjunction with stationary receivers, for example, an array of ocean-bottom nodes, or with ocean-bottom cables deployed on the seabed.

During operation, acoustic shock waves generated by the source array propagate through the water to penetrate the ocean floor and are reflected from subsurface structures. The reflected acoustic waves are recorded as signals or seismic responses by the receivers, e.g., hydrophones and/or geophones towed behind a vessel or deployed on the ocean floor.

Lateral forces are applied to maintain position and spacing of the seismic sources and other array elements as they are towed behind the vessel. The spacing depends on the number of sources and/or streamer cables that are deployed, and on the spacing between adjacent source and/or receiver components. Typically, a number of source sub-arrays or strings are deployed behind the vessel using a tow rope configuration to spread the sources over lateral distances of approximately ten to one hundred meters or more. Streamer cables are typically deployed over much larger lateral distances, for example, from one hundred meters to a kilometer or more, and may extend for several kilometers behind the tow vessel.

Lateral spacing can be achieved by deploying a paravane or diverter apparatus on a dedicated tow rope arrangement using a spreader or series of individual tether lines to provide the desired spacing between adjacent cables. Positioning devices can also be provided along each streamer cable, in order to maintain depth and/or lateral offset along the cable length.

Figure 1:
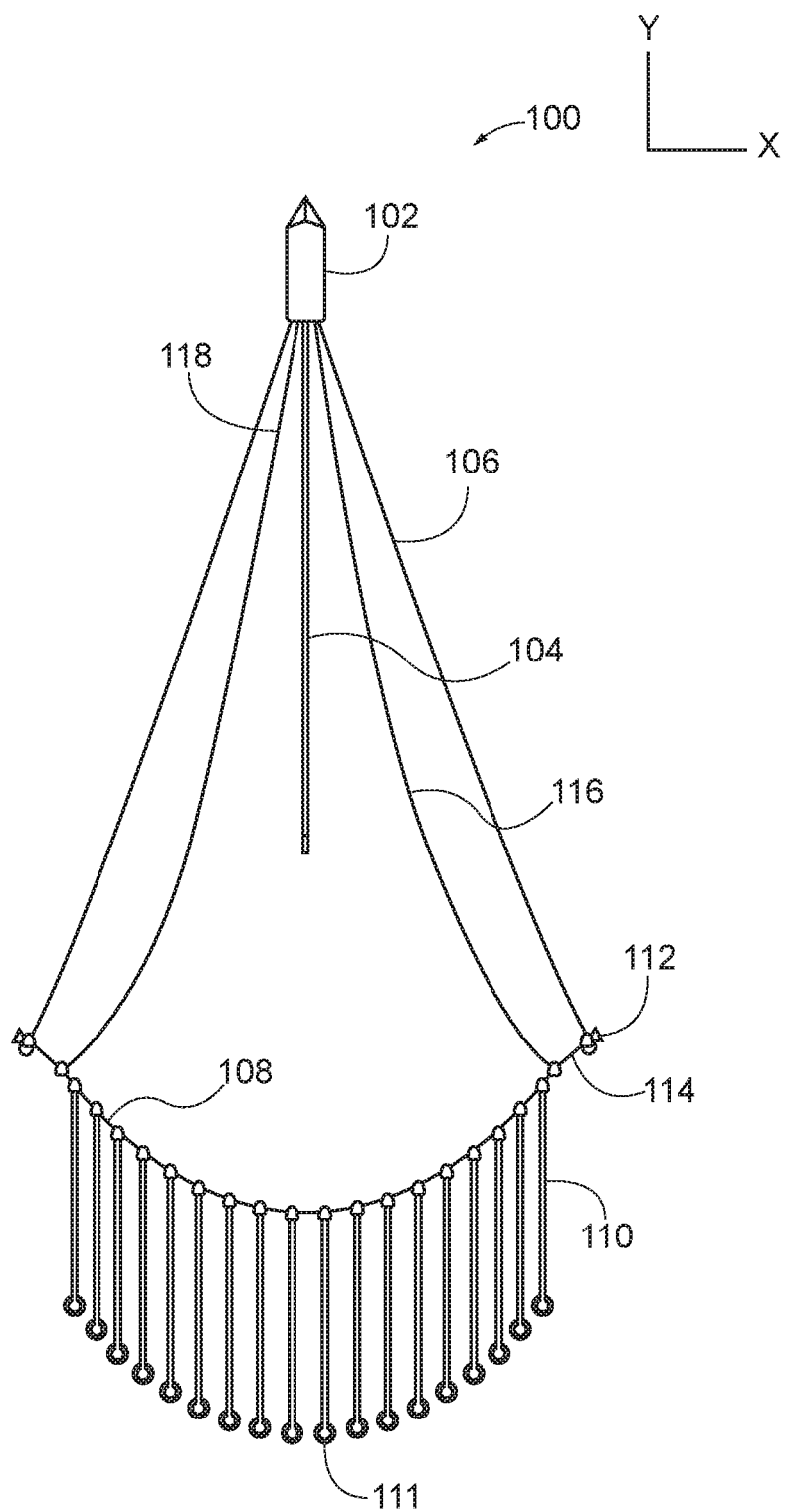
FIG. 1 is a top plan view of a schematic illustration of a first example of a towed, three-dimensional, high-resolution seismic array.
Figure 2:
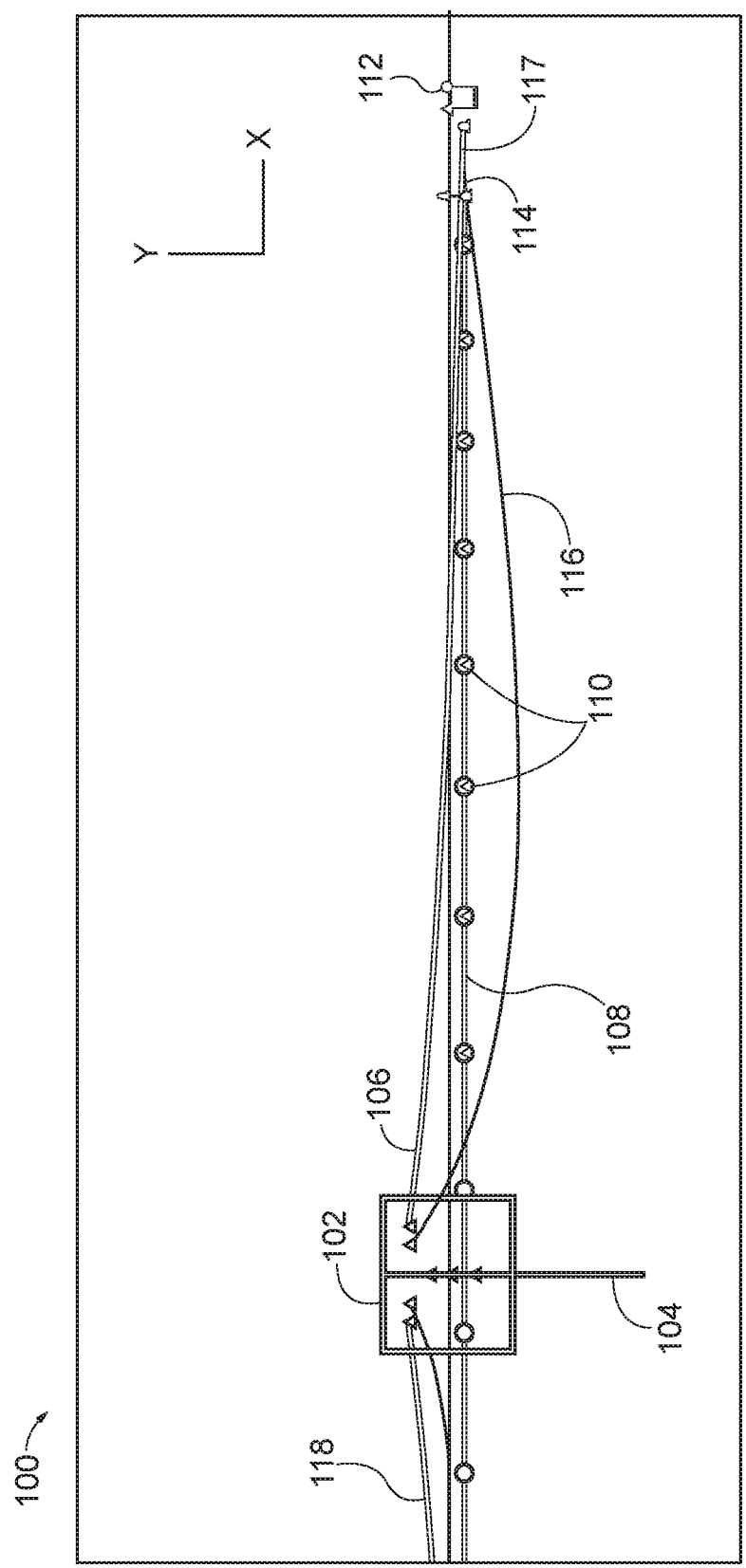
FIG. 2 is a rear elevation view of a schematic illustration of the towed seismic array of FIG. 1.

One embodiment of a towed three-dimensional, high-resolution, marine seismic array 100 is depicted in FIGS. 1 and 2. The array 100 is towed by a marine vessel 102. A number of cables, ropes, or other lines may be attached to the marine vessel 102. For example, an umbilical cable 104 with acoustic signal source generators (e.g., air guns) may trail directly behind the marine vessel 102. A pair of tow ropes 106 or cables may splay out to port and starboard from the rear of the marine vessel 102. A cross-cable 108 may extend between and connect to the tow ropes 106 adjacent the aft ends of the tow ropes 106. A number of streamer cables 110 may be connected to the cross-cable 108 at a number of locations along the length of the cross-cable 108 between the tow ropes 106. In some embodiments, the streamer cables 110 may be evenly spaced apart from adjacent streamer cables 110 along the length of the cross-cable 108. In a typical embodiment, there may be up to 18 streamer cables 110 and they may be spaced anywhere between 10 m and 100 m or more apart. Respective tail buoys 111 may be affixed to the ends of each of the streamer cables 110 to aid in maintaining a constant depth of the streamer cables 110 below the surface.

The cross-cable 108 may extend beyond the port-most and starboard-most streamer cables 110 to attach to the tow ropes 106. These lateral sections of the cross-cable 108 may be referred to as spur lines 114. In some embodiments, the spur lines 114 may be separate ropes or cables that connect to and extend between the lateral ends of the cross-cable 108 and the tow ropes 106.

Paravanes 112 may further be attached to the tow ropes 106 at or adjacent to the connection between the tow ropes 106 and the spur lines 114 on each of the port and starboard sides. The paravanes 112 are winged hydrofoils that move outward in the water in an oblique direction to the direction of travel of the marine vessel 102, thus providing lateral spread to the cross-cable 106 and the streamer cables 110 attached thereto.

A signal cable 116 may extend from the marine vessel 102 on one side of the array 100 to connect to the cross-cable 108 and return signals received by the sensors 113 on the streamer cables 110. On an opposite side of the array 100, a recovery rope 118 may extend from the marine vessel 102 and connect with the cross-cable 108 adjacent to the last streamer 110. Surface floats 117 may be attached to the cross-cable 108 at or adjacent to the lateral ends thereof via a cable with a length corresponding to a desired depth of the streamer cables 110. The surface floats 117 act to ensure that the cross-cable 108, and thus the streamer cables 110, do not submerge too deeply when the array 100 is towed.

Unfortunately, the port and starboard ends of the cross-cable 108, and thus the streamer cables 110 attached thereto, may not achieve a desired depth beneath the surface due to the pull of the paravanes 112 on the spur lines 114. The paravanes 112 remain at the surface of the water and thus pull the lateral ends of the cross-cable upward as well as laterally outward.

Figure 3:
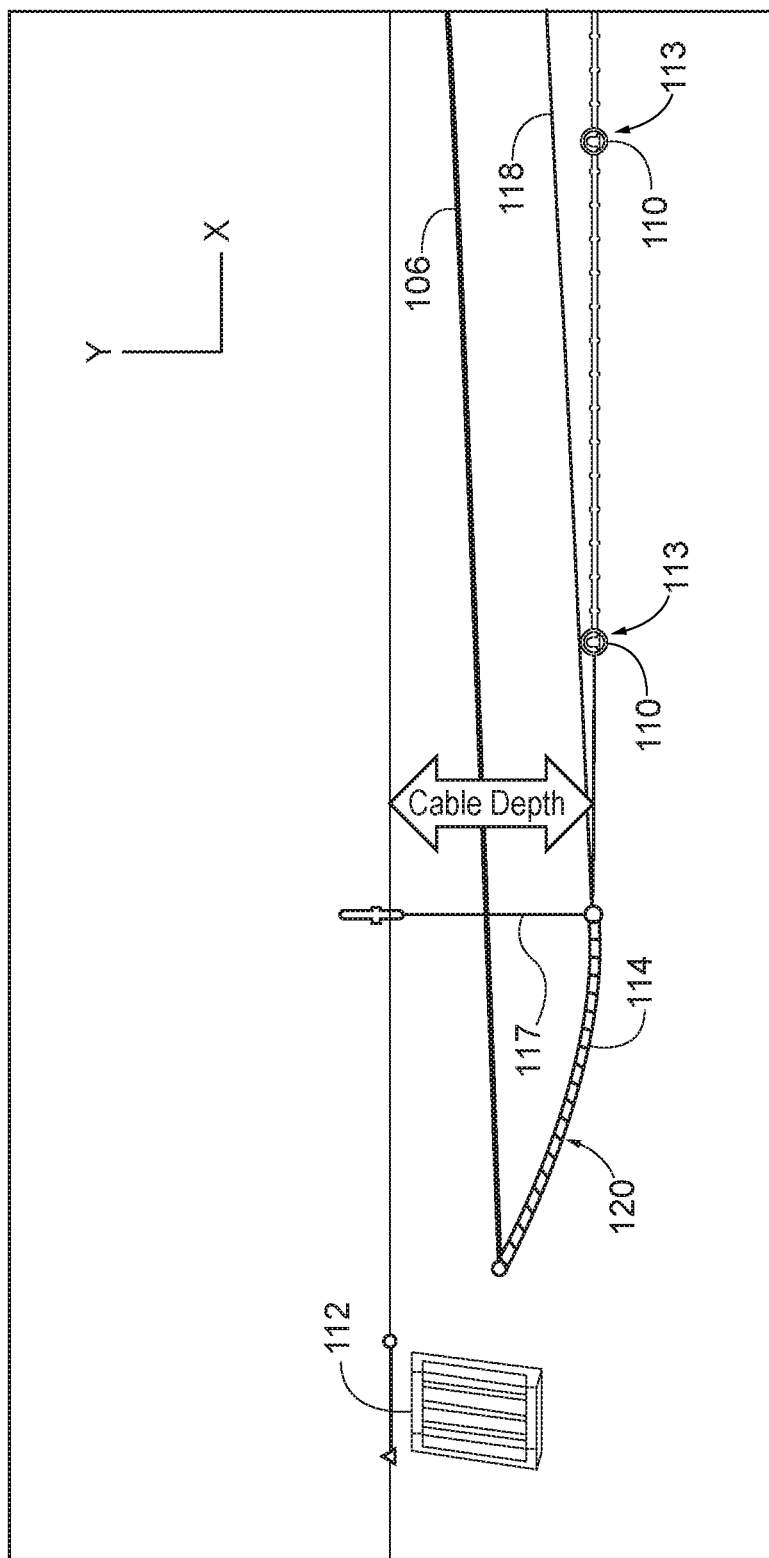
FIG. 3 is an enlarged, partial rear elevation view of a schematic illustration of a port side of the towed seismic array of FIG. 1 with a system of ribbon-foil depressors provided on the spur line.

A number of positioning devices or depressors 120 designed to provide downward lift to counteract the effect of the paravanes 112 on the cross-cable 108 may be attached to the cross-cable 108, the spur line 114, or both. These depressors 120 may be shaped as foils and may be pivotably attached to the cross-cable 108 or the spur line 114 to move independently of each other, or in concert in some embodiments. As the depressors 120 are independent of each other, they may evoke an appearance resemblant of a ribbon fairing for a cable. The depressors 120 may thus be referred to herein as "ribbon-foil depressors." As shown in FIG. 3, the depressors 120 may fill the entire length of the spur line 114. Alternatively, the depressors 120 may only fill a portion of the spur line 114 and may be situated either laterally outward closer to the paravanes 112 or more inward closer to the streamer cables 110. As noted above, the depressors 120 may also be positioned on the cross-cable 108, inside the port-most and starboard-most streamer cables 110. The location of the depressors 120 may be selected based upon a number of factors including the amount of downward lift generated by the depressors 120, the separation distance of the streamer cables 110, the mass of the sensors 113, streamer cables 110, and cross-cable 108, and the lift force generated by the paravanes 112 among other factors.

Figure 4:
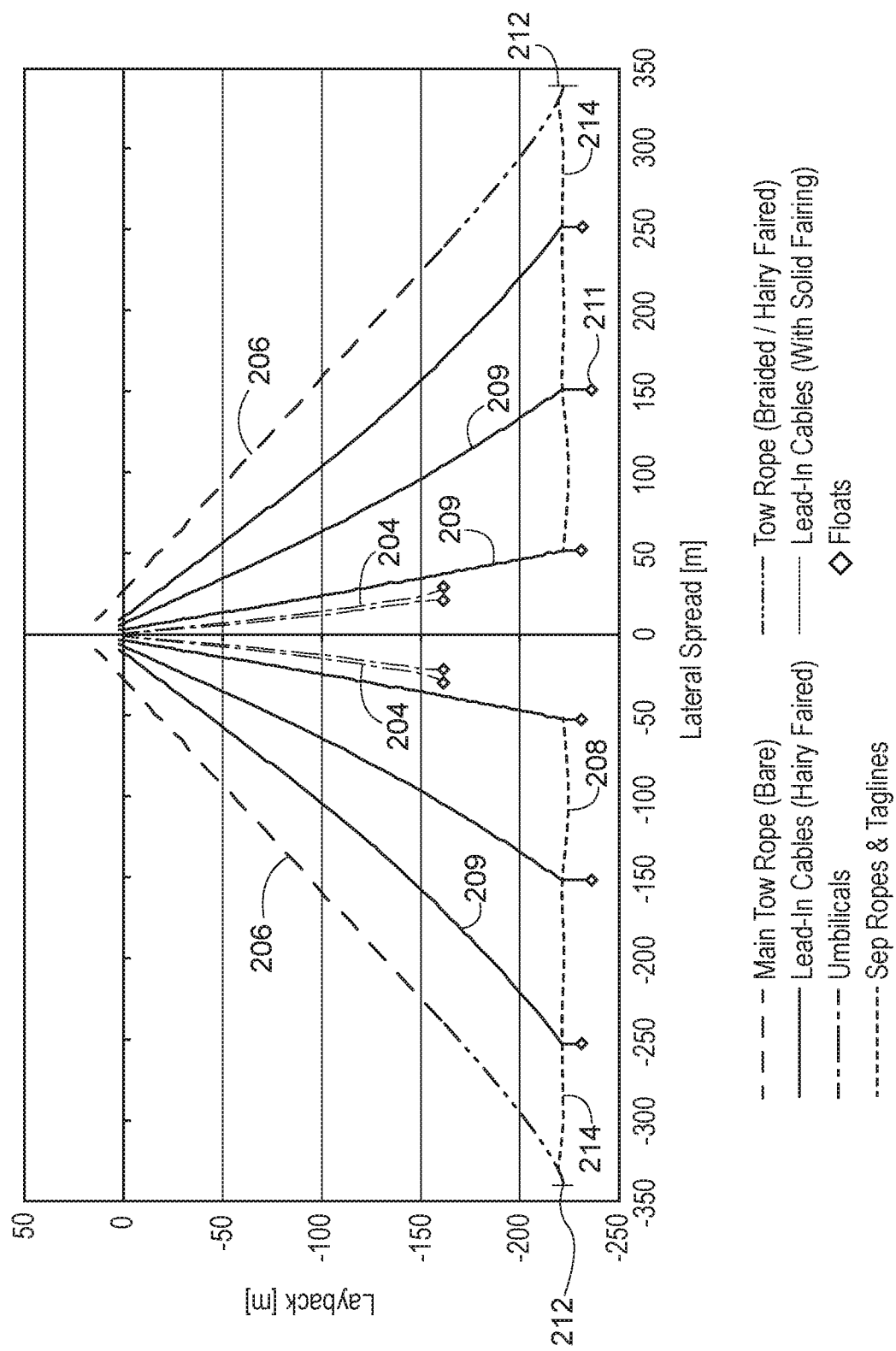
FIG. 4 is a top plan view of a schematic illustration of a second example of a towed seismic array.
Figure 5:
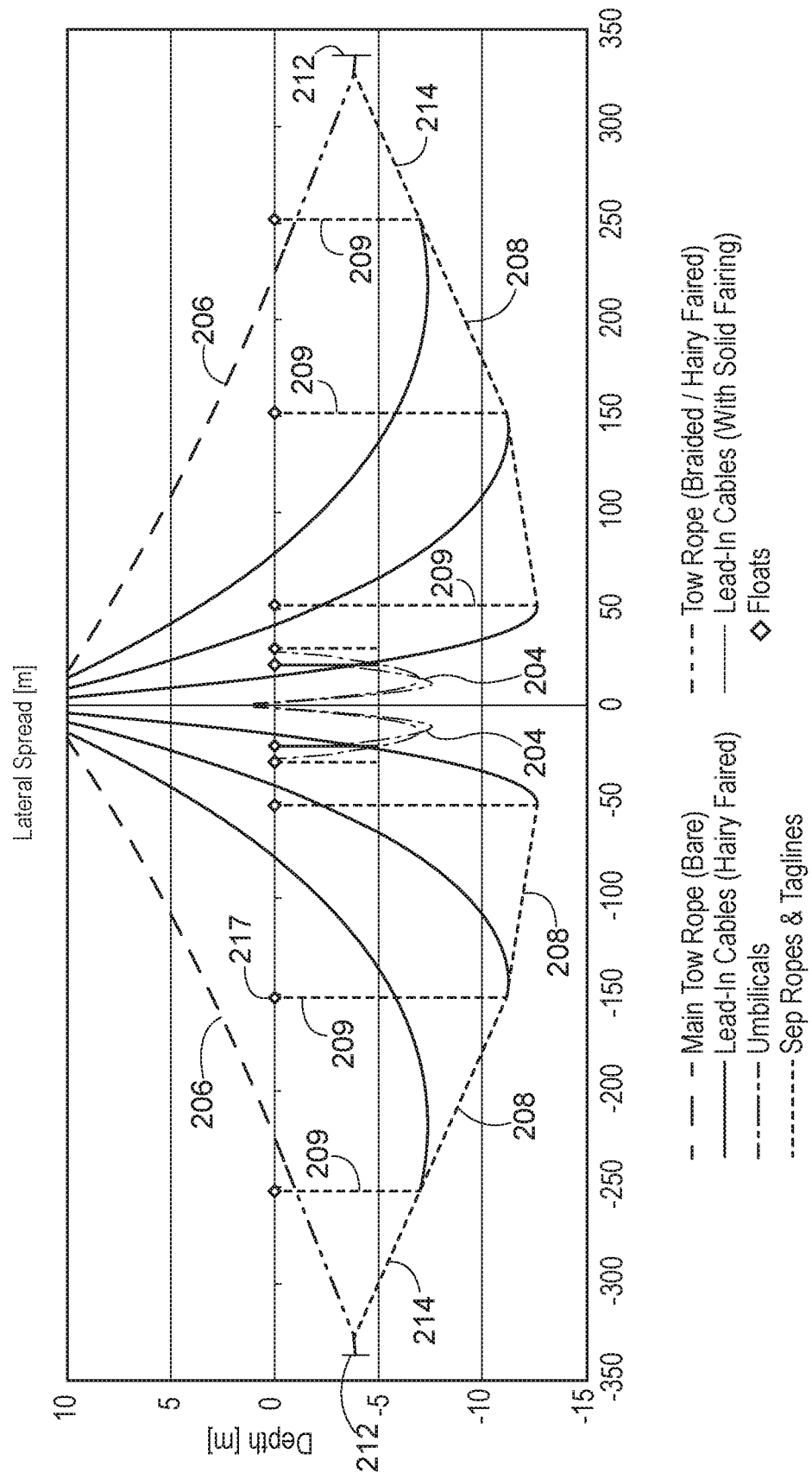
FIG. 5 is a rear elevation view of a schematic illustration of the towed seismic array of FIG. 4.

Another example of a towed seismic array 200 is presented in FIGS. 4 and 5. FIG. 4 depicts the array 200 from a top plan view and indicates the distance of the tow cables 206 and tether or lead-in cables 209 from the stern of the marine vessel (not shown) on the vertical axis and thus the spread distance between the streamer cables (not shown) connected to the aft ends of the lead-in cables 209 on the horizontal axis. FIG. 5 depicts the array 200 from a rear elevation view and indicates the depth of position of the aft ends of the lead-in cables 209 and, correspondingly, the depth of the forward ends of the streamer cables below the head-end floats 211 on the vertical axis and the spread distance between the aft ends of the lead-in cable and forward ends of the streamer cables (not shown) on the horizontal axis. As in the prior embodiment, a number of umbilical cables 204 with acoustic signal source generators may trail directly behind the marine vessel.

In this embodiment, the forward ends of the streamer cables 210 attach at a single point rather than at a number of points spread along a cross-cable. The aft ends of each adjacent pair of the lead-in cables 209 are connected together by separation ropes 208, which may be between 25 m and 200 m or more in length and thus may extend similarly as far aft of the marine vessel such that the sensors are generally positioned along a horizontal line. Surface floats 217 may be attached to the separation ropes 208 at or adjacent to the port-most and starboard-most streamer cables 210 via a cable with a length corresponding to a desired depth of the streamer cables 210. The surface floats 217 act to ensure that the streamer cables 110, do not submerge too deeply when the array 200 is towed.

Spur lines 214 may extend from the aft ends of each of the port-most and starboard-most lead-in cables 209, respectively, and attach to a pair of tow ropes 206 extending along the lateral sides of the array 200. The spur lines 214 may be up to 75 m in length or more. The paravanes 212 may further attach to the connection point between the spur lines 214 and the tow ropes 206 to spread the aft ends of the lead-in cables 209 apart.

Figure 6:
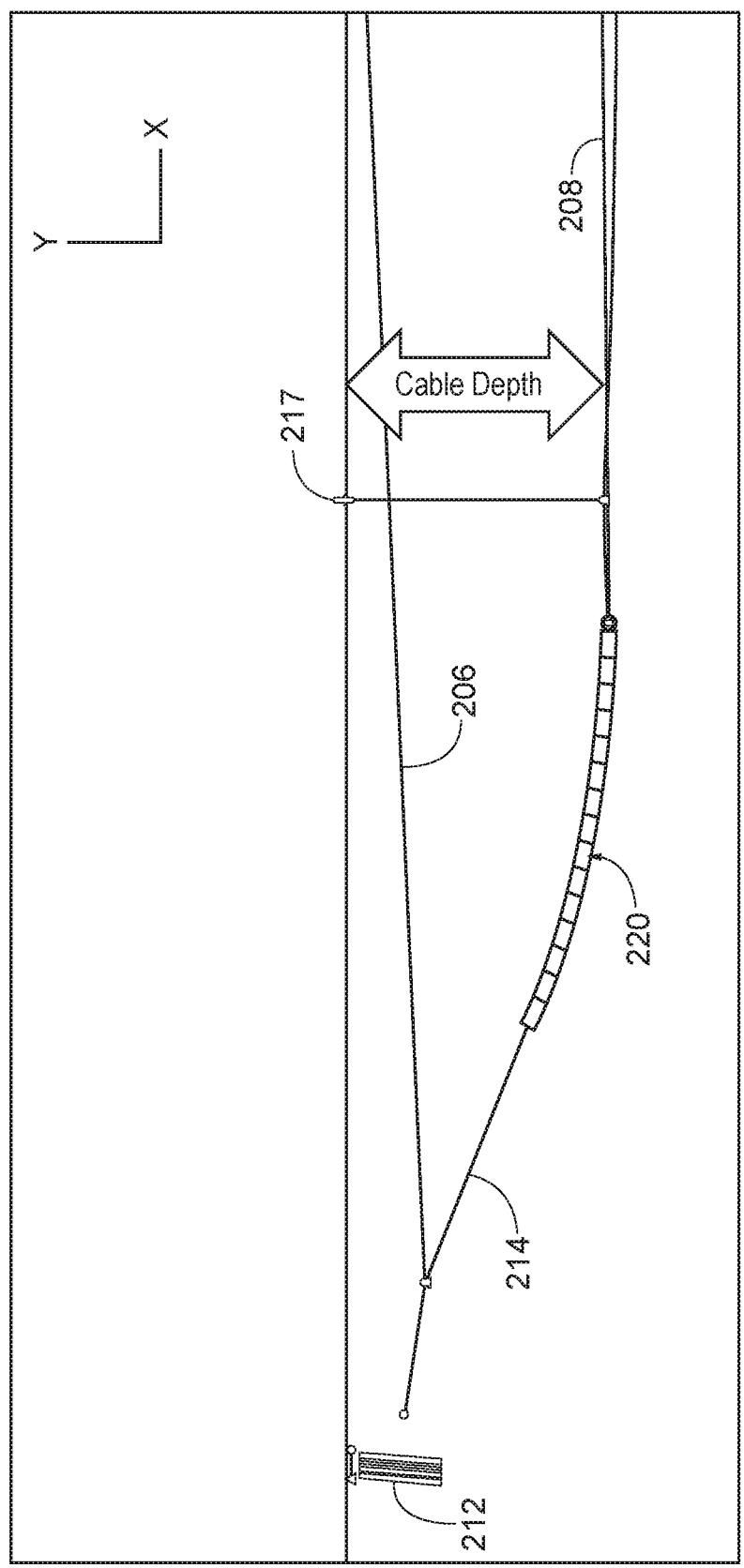
FIG. 6 is an enlarged, partial rear elevation view of a schematic illustration of a port side of the towed seismic array of FIG. 4 with a system of ribbon-foil depressors provided on the spur line.

As depicted in FIG. 5, the paravanes 212 effect an upward lift on the spur lines 214 and thus raise the aft ends of the port and starboard lead-in cables 209, and thus the streamer cables connected thereto, above the desired depth at which the middle streamer cables 210 extend. Therefore, according to an alternate implementation, a series of ribbon-foil depressors 220 may be attached to the spur lines 214 as shown in FIG. 6. Such ribbon-foil depressors 220 may extend the entire length of the spur lines 214 or only a portion thereof. If the ribbon-foil depressors 220 extend only a portion of the length of the spur lines 214, they may be located adjacent to the bridle connection for the paravane 212, adjacent to the port-most and starboard-most lead-in cables 209, or in between the respective paravane 212 and lead-in cable 209. Alternatively, the depressors 120 may be positioned on the separation rope 208 inside the port-most and starboard-most streamer cables 210 or on both the spur lines 214 and the separation ropes 208. The location of the depressors 220 may be selected based upon a number of factors including the amount of downward lift generated by the depressors 220, the separation distance between the lead-in cables 209, the mass of the lead-in cables 209, and the lift force generated by the paravanes 212 among other factors.

Figure 7:
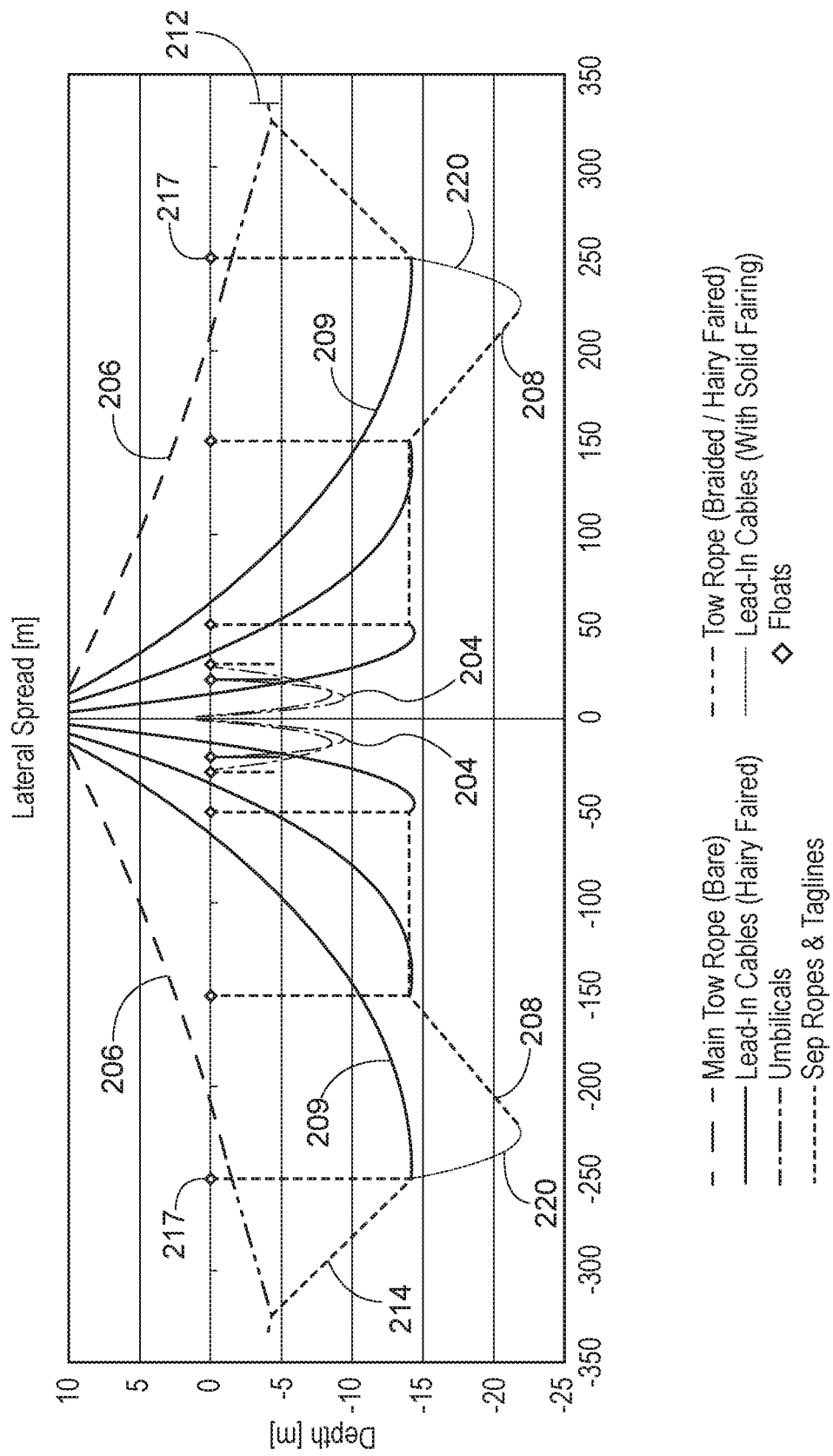
FIG. 7 is a rear elevation view of a schematic illustration of the towed seismic array of FIG. 4 with a system of ribbon-foil depressors provided on the port and starboard separation lines.

FIG. 7 schematically depicts the effect of the ribbon-foil depressors 220 on the array 200 when attached to the separation ropes 208 inside the port-most and starboard-most streamer cables 210. The aft ends of the port-most and starboard-most lead-in cables 209 are submerged to the desired depth (in this example, 14 m) to coincide with the depth of the middle lead-in cables 209. The ribbon-foil depressors 220 thereby provide downward lift on the separation ropes 208 to counter the upward lift effects of the paravanes 212 and maintain submergence of the lead-in cables 209, and thus the streamer cables, at an appropriate depth.

Figure 8A:
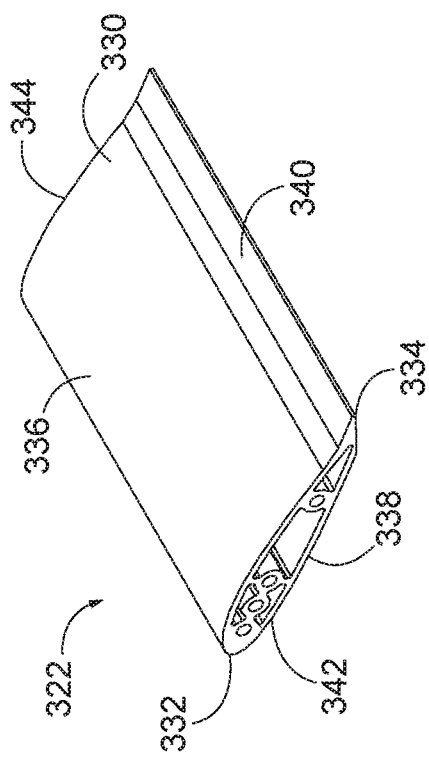
FIG. 8A is an isometric view of a single ribbon-foil depressor section.
Figure 8B:
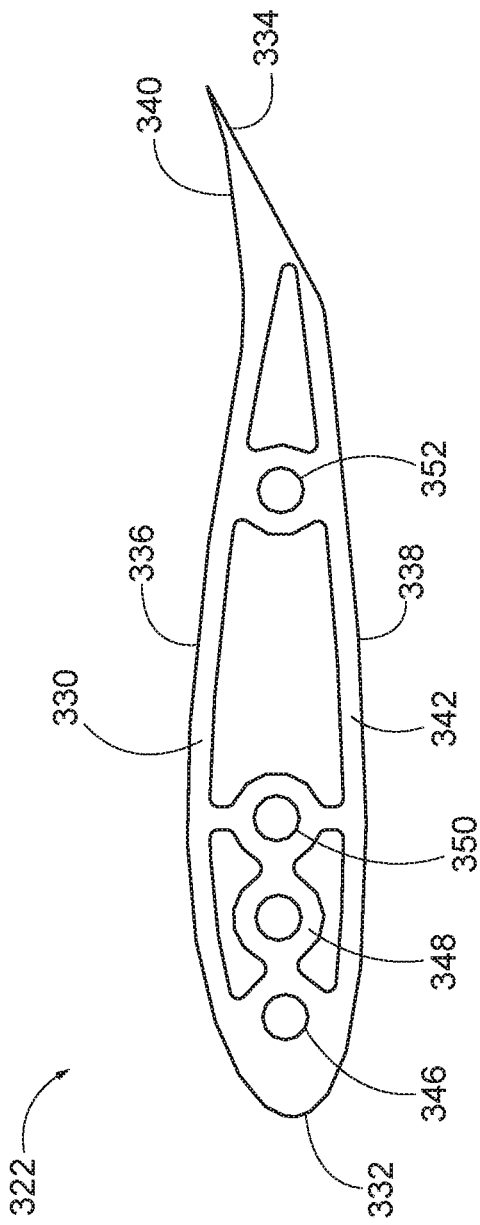
FIG. 8B is a left side elevation view of the ribbon-foil depressor section of FIG. 8A.

An exemplary form of a single depressor section 322 of a ribbon-foil depressor is depicted in FIGS. 8A and 8B. The depressor section 322 is scalable to suit a wide range of lift requirements, while also offering very high aspect ratios and avoiding any requirement for supplementary ballast. The depressor section 322 has a body 330 with a foil shape having a leading edge 332 and a trailing edge 334. The line connecting the leading edge 332 and the trailing edge 334 passing through the mid-thickness of the body 330 is referred to as the "chord line" of the foil shape. When viewed from a top plan perspective, the depressor section 322 may appear rectangular in shape. A first surface 336 extends between the leading edge 332 and the trailing edge 334 and may be cambered. A second surface 338 of the body 330 extends between the leading edge 332 and the trailing edge 334 and may be relatively flat with respect to the first surface 336.

A tail flap 340 may form a portion of the trailing edge 334. The tail flap 340 may extend above and aft of the first surface 336 and form an obtuse angle with respect to the first surface 336. A tail flap 340 can be created by "bending" the body 330 at the chord line at some discrete distance forward of the trailing edge 334. In some embodiments, the tail flap 340 extends across between 5% and 25% of the length of the chord line of the depressor section 322. In some embodiments, the bend angle of the tail flap 340 can be a departure of 5° up to 20° or 30° away from the axis of the original chord line. This results in the obtuse angle between the first surface 336 and the tail flap 340 being between 150 degrees and 175 degrees. The combination of the camber of the first surface 336 and the length and angle of the tail flap 340 may be configured to provide negative lift as further described below.

"Bending" the aft portion of the depressor section 322 in this fashion represents only one possible method for creating a tail flap 340. Other ways may include truncating the original depressor section 322 by removing some portion of the trailing edge 334, and replacing it with another trailing section having a chord line that departs from the chord line of the leading edge 332 of the body 330. Alternatively, the original foil shape of the depressor section 322 could be left entirely intact while a separate, additional trailing edge section is appended to the original foil shape, either directly behind the trailing edge 334 of the depressor section 322, or at some distance downstream of the trailing edge 334 of the depressor section 322.

The body 330 has two lateral sides 342, 344 that extend between the lateral edges of the first surface 336 the second surface 338 and between the leading edge 332 and the trailing edge 334. The body 330 may be made from solid cast polyurethane for near-neutral buoyancy and high abrasion resistance and durability. However, the body 330 may still be slightly negatively buoyant, such that the body 330 will influence the equilibrium angle of attack, especially at low tow speeds. Thus, the downforce achieved by the depressor section 322 may be influenced by selecting the composition of the body 330.

A first tubular conduit 346 may be defined within the body 330 and extend laterally through the body 330 adjacent to the leading edge 332 and open to each of the first and second lateral sides 342, 344. The first tubular conduit 346 is sized to receive ropes or cables (such as separation ropes and/or spur lines) of a seismic array therethrough. A second tubular conduit 348 may be defined within the body 330 and extend laterally therein adjacent to, aft of, and parallel to the first tubular conduit 346 and open to each of the first and second lateral sides 342, 344. The second tubular conduit 348 is similarly sized to receive ropes or cables of the seismic array therethrough. A third tubular conduit 350 may be defined within the body 330 and extend laterally therein adjacent to, aft of, and parallel to the second tubular conduit 348 and open to each of the first and second lateral sides 342, 344. The third tubular conduit 350 may be similarly sized to receive ropes or cables of the seismic array therethrough. Each of the first, second, and third tubular conduits 346, 348, 350 may be positioned within the forward 50 percent of the chord length of the depressor 322.

A fourth tubular conduit 352 may be defined within the body 330 and extend laterally therein aft of and parallel to the third tubular conduit 350 and open to each of the first and second lateral sides 342, 344. The fourth tubular conduit 352 may be positioned within the aft 50 percent of the of the cord length of the depressor 322 and forward of the beginning of the tail flap 340. The fourth tubular conduit 352 may be similarly sized to receive a rope or cable therethrough. The fourth tubular conduit 352 may alternatively be filled with syntactic foam or other more buoyant material to help counteract the negative buoyancy of the polyurethane material forming the body 330.

Figure 9:
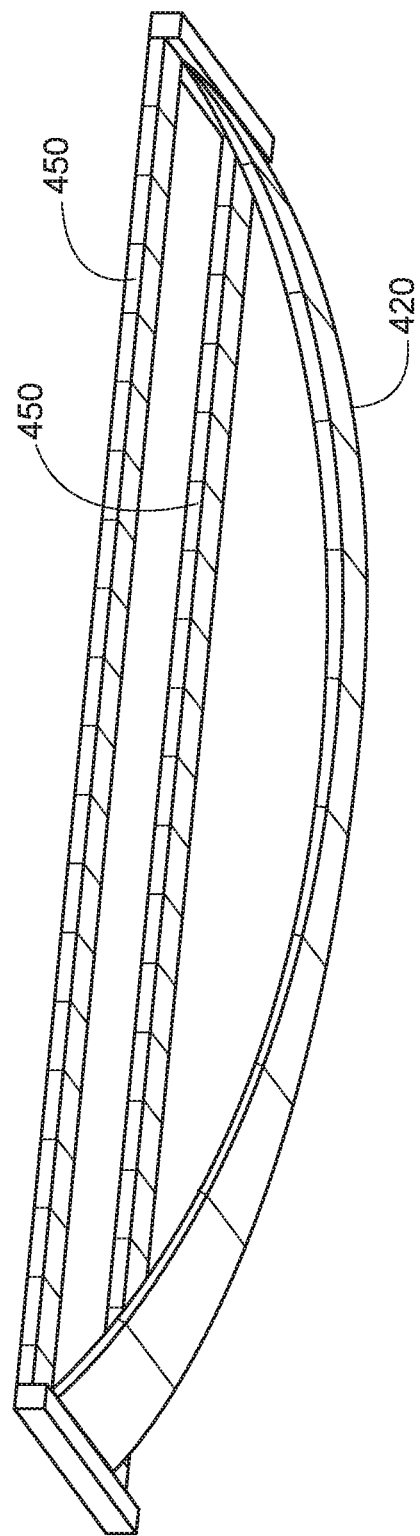
FIG. 9 is a model depicting deflection of a ribbon-foil depressor on a cable as compared to standard symmetrical fairings.

According to one embodiment, the ribbon-foil depressor 120, 220 of FIGS. 3 and 6 may be configured as a string of segmented, cambered, foil depressor sections 322 as shown in FIGS. 8A and 8B, each preferably with a tail flap 340. The ribbon-foil depressor 120, 220 may be a passive, non-steerable depressor for the depression of outboard streamer heads in seismic arrays, relative to the depth of the crucifixes of the paravane 112, 212 to which the spur lines 114, 214 are attached. In this implementation, the ribbon-foil depressors 120, 220 generate sufficient downforce to cause the catenary of the spur lines 114, 214 to curve downwards to the desired streamer depth, over the span of 10 to 100 meters, depending on the length of the spur lines 114, 214 in operation. This downward curve is modeled in FIG. 9 in which a ribbon-foil depressor 420 is mounted on a rope or cable in a flume tank. The downward depression of the rope on which the ribbon-foil depressor 420 is mounted is clear in comparison to the symmetric fairings 450 mounted on rods extending across the test fixture in the flume tank. In this embodiment, the depressor sections 322 may be threaded onto either a rope or rigid rod through one of the first, second, or third tubular conduits 346, 348, 350 in the forward half of the chord length of the body 330.

The ribbon-foil depressor 120, 220 is scalable to suit a wide range of negative lift requirements, while also offering very high aspect ratios and avoiding any requirement for supplementary ballast. The depressor sections 322 of may be free to rotate in a flow field. The angle of attack at which the ribbon-foil depressor 120, 220 will achieve equilibrium will be a function of the center of rotation about which the depressor sections 322 pivot, and the moment coefficient of the particular airfoil shape of the depressor section 322 being used. The center of rotation for the depressor sections is the one of the first, second, or third tubular conduits 346, 348, 350 toward the leading edge 332 of the body 330 through which the rope or bar passes.

Most cambered airfoils shapes, such as a NACA2318, for example, will have a moment coefficient that is negative, meaning that the airfoil will find an equilibrium angle of attack that is negative when allowed to freely rotate about a pivot point. In order to create a positive moment coefficient, i.e., in order to generate a positive angle of attack and achieve high maximum downward lift with greater lift-to-drag efficiency, the tail flap 340 may be added to the airfoil camber of the first surface 336 of the body 330. In some embodiments, the depressor sections 322 may conform to the NACA2318 standard shape and have a maximum camber of 2% located at 30% of the chord line (or 0.3. of the chord line length from the leading edge 332) with a maximum thickness of 18% of the chord line length.

The multiple tubular conduits 346, 348, 350 are provided for flexibility in selecting a pivot point. Inserting a rope or rod into any of the three forward tubular conduits 346, 348, 350 means that the depressor sections 120, 220 will freely pivot on that center of rotation and reach its own equilibrium angle of attack in the flow field. The equilibrium angle of attack achieved by the depressor sections 120, 220 configured passively in forming the ribbon-foil depressor 120, 220 may be determined through a selection of the following parameters:

Location of the pivot, i.e., the tubular conduit 346, 348, 350 through which the rope passes relative to the leading edge 332 of the body 330;

The particular foil shape of the depressor sections 322 (or a symmetric foil shape in combination with a suitable tail flap 340), The angle of attack of the tail flap 340 (if any); and The percentage of chord line of the tail flap 340 (if any).

Figure 10:
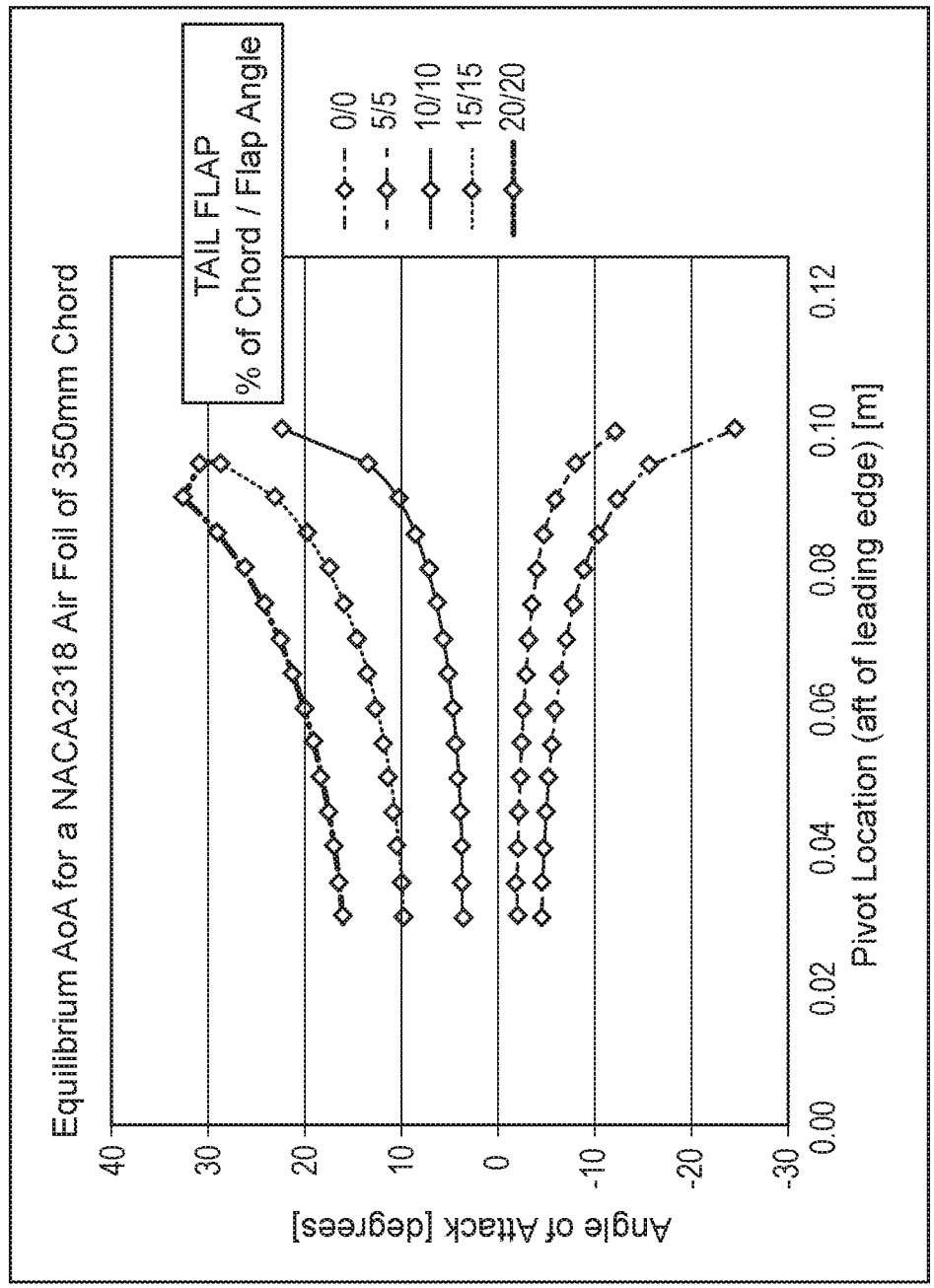
FIG. 10 is a plot of angle of attack of an exemplary ribbon-foil depressor section as compared to the pivot location of the ribbon-foil depressor section.

As shown by the plot graph of FIG. 10, the length and angle of the tail flap 340 and the pivot location together directly influence the resultant equilibrium angle of attack of the depressor sections 322. The greater the length and angle of the tail flap 340, the greater the angle of attack. When the pivot point is close to the leading edge 332, the effect on the angle of attack is minimal, but as the pivot point moves aft of the leading edge 332, the effect on the angle of attack becomes pronounced.

Figure 11:
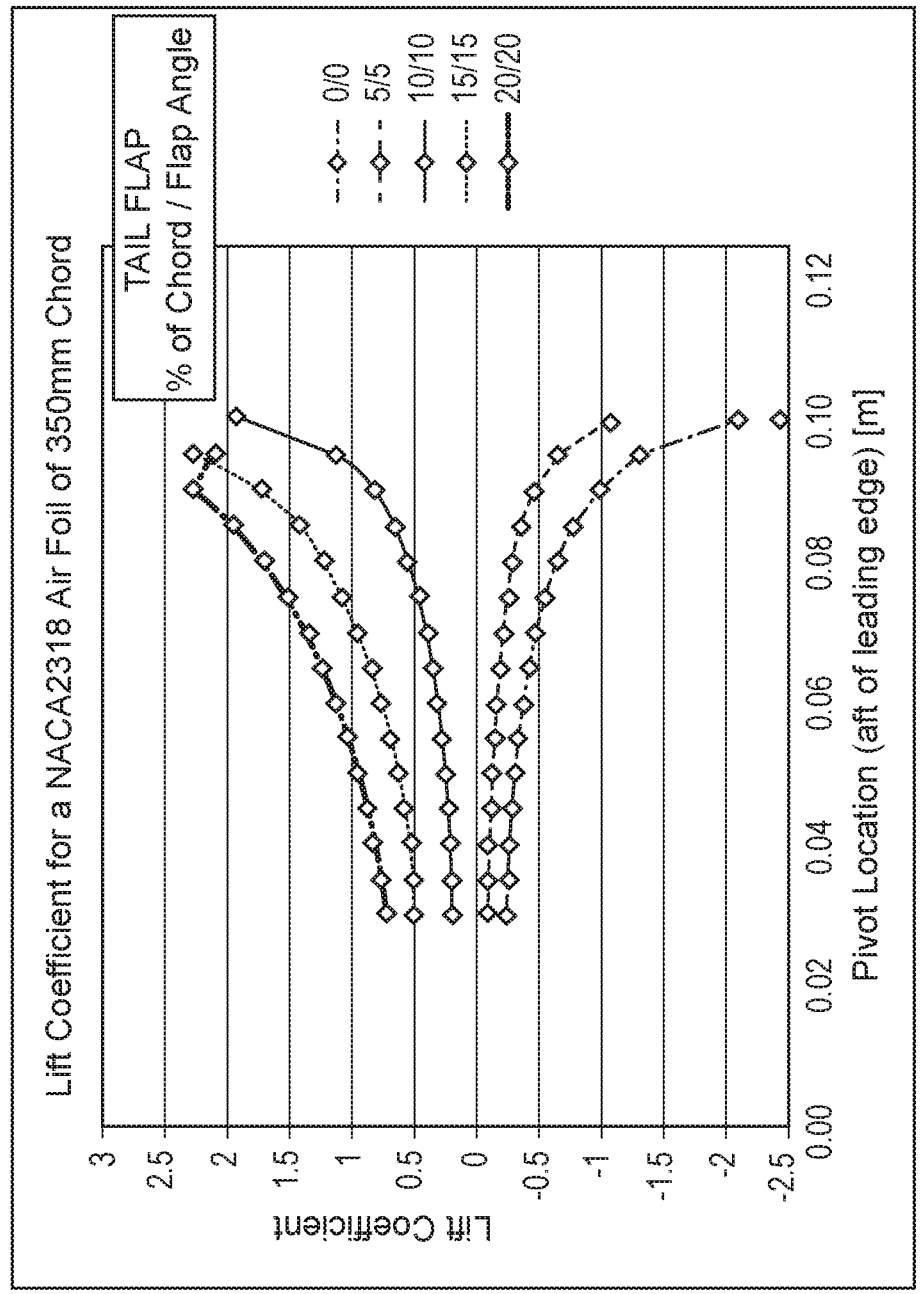
FIG. 11 is a plot of the lift coefficient of an exemplary ribbon-foil depressor section as compared to the pivot location of the ribbon-foil depressor section.

Similarly, as shown in FIG. 11, the length and angle of the tail flap 340 and the pivot location together directly influence the resultant lift coefficient of the depressor sections 322. The greater the length and angle of the tail flap 340, the greater the lift coefficient. When the pivot point is close to the leading edge 332, the effect on the lift coefficient is minimal, but as the pivot point moves aft of the leading edge 332, the effect on the lift coefficient becomes pronounced.

Figure 12:
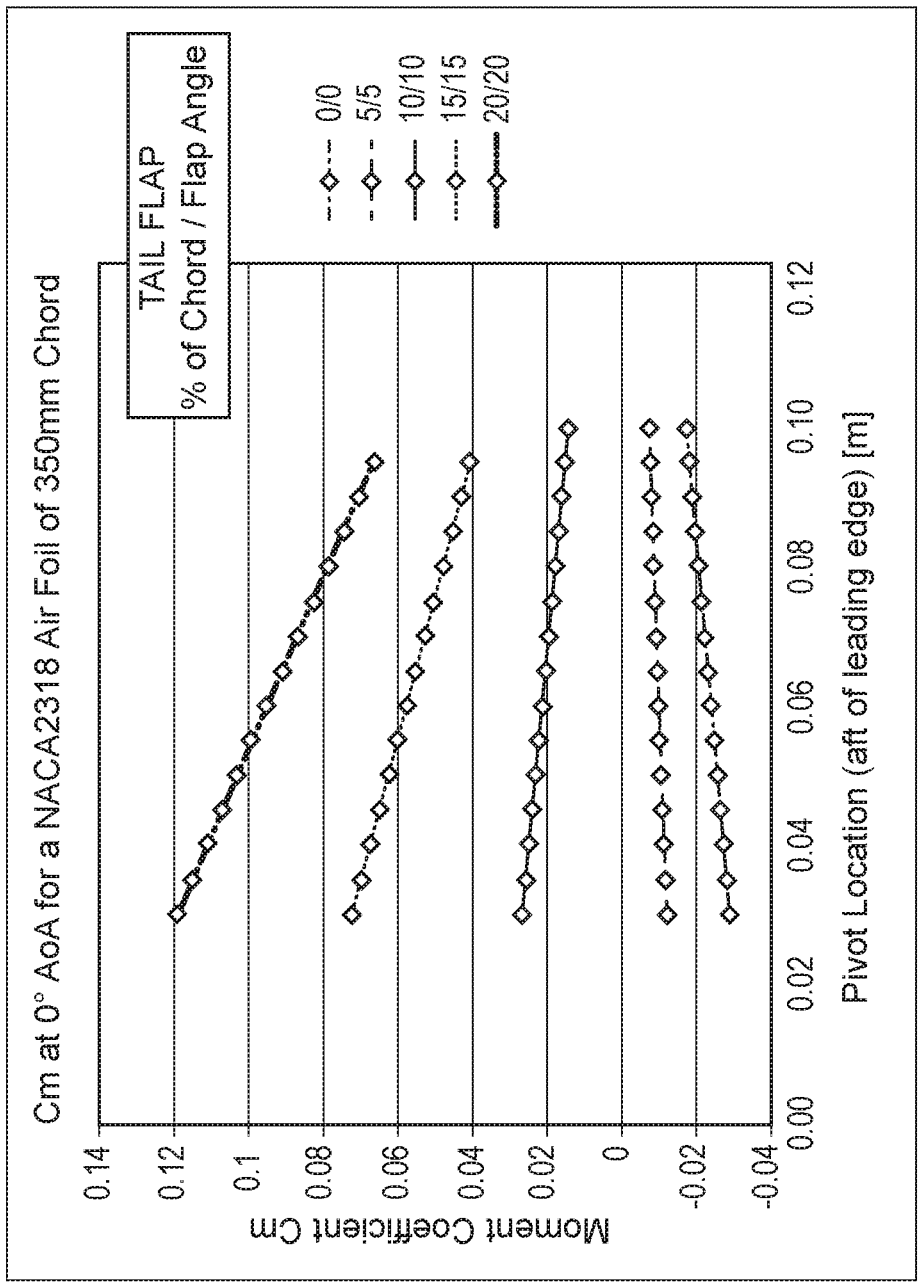
FIG. 12 is a plot of the moment coefficient of an exemplary ribbon-foil depressor section as compared to the pivot location of the ribbon-foil depressor section.

Additionally, as shown in FIG. 12, the length and angle of the tail flap 340 and the pivot location together directly influence the resultant moment coefficient of the depressor sections 322. The greater the length and angle of the tail flap 340, the greater the moment coefficient. When the pivot point is close to the leading edge 332, the effect on the moment coefficient is minimal, but as the pivot point moves aft of the leading edge 332, the effect on the moment coefficient becomes pronounced and the moment coefficient is driven toward 0. If the pivot location is well forward and no tail flap 340 is included, then a cambered foil shape of the depressor section 322, as shown in FIGS. 8A and 8B, will actually find a negative angle of attack at equilibrium. Moving the pivot point slightly aft and introducing a small tail flap 340 will cause the moment coefficient to change signs, such that the depressor section 322 will find its equilibrium at a positive angle of attack.

Consequently, the magnitude of downforce generated by the ribbon-foil depressor 120, 220 formed by depressor sections 322 can be controlled by various factors including the following:

Adjusting the overall span of the ribbon-foil depressor 120, 220 (i.e. the number of depressor sections 322 threaded onto the rope or rod);

Varying the length of the chord of the depressor sections 322 (i.e. customize the size of the depressor sections 322 at time of manufacture to suit the required end application);

Selection of the pivot location with respect to the leading edge on the depressor sections 322 for the rope or rod (i.e., the further aft the pivot point is of the leading edge 332, the higher the resulting angle of attack of the depressor section 322);

Varying the angle of attack of the tail flap 340;

Varying the size of the tail flap 340 (i.e., selection of the percentage of chord of the tail flap 340), and Choice of camber for the foil profile of the depressor sections 322 (lesser or greater cambered foil depressor sections 322 generate lower or higher lift coefficients).

In an alternate implementation, a second rope or cable may be threaded through the fourth tubular conduit 352 in the depressor sections 322 of the ribbon-foil depressor 120, 220. The second rope or cable allows for adjustment of the lift by controlling the catenary (billow) of the ribbon-foil depressor 120, 220. In this embodiment, the pair of ropes may be adjusted in length to effect controllable adjustments in lift. The equilibrium angle of attack achieved by this embodiment is a function of the relative lengths of the dual ropes. For example, if the aft rope passing through the fourth tubular conduit 352 in the aft half of the depressor sections 322 is shortened with respect to the rope passing through the selected pivot point in one of the first, second, or third tubular conduits 346, 348, 350, the trailing edges 334 of the depressor sections 322 will be pushed closer together laterally as compared to spacing between the depressor sections 322 at the leading edges 332. This causes the ribbon-foil depressor 120, 220 to billow and change the angle of attack along the length of the ribbon-foil depressor 120, 220.

Figure 13B:
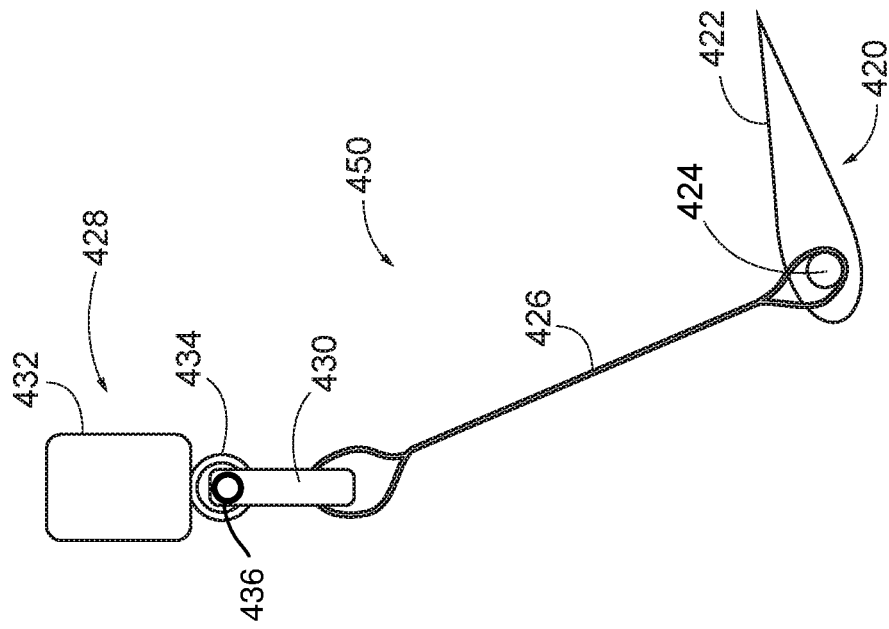
FIG. 13B is a port side elevation view of a schematic illustration of the ribbon-foil depressor array of FIG. 13A.
Figure 13A:
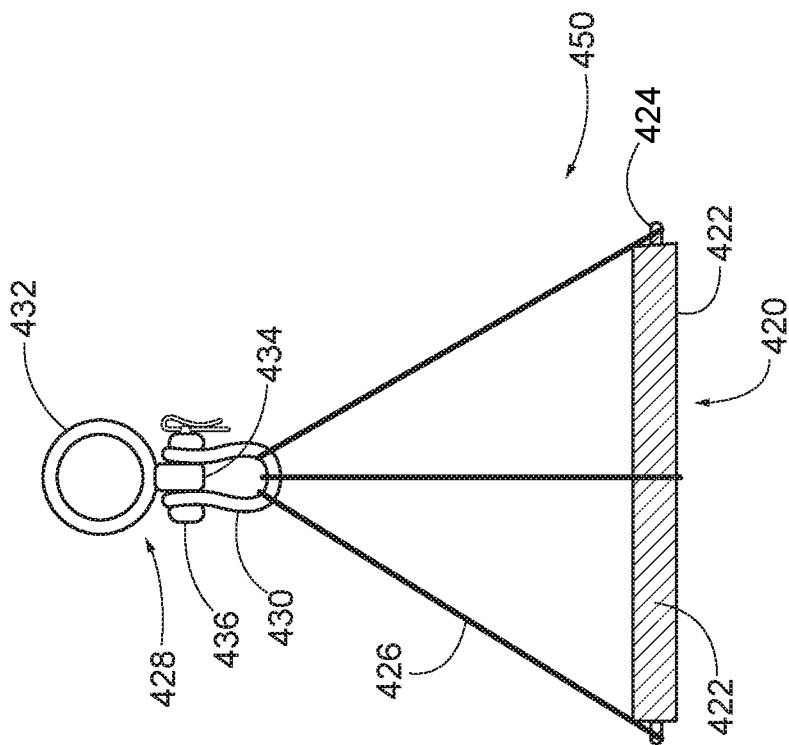
FIG. 13A is a rear elevation view of a schematic illustration of a ribbon-foil depressor array on a bar configured for attachment by a bridle to a cable, wherein the foil and bar are shown in cross-section.
Figure 14:
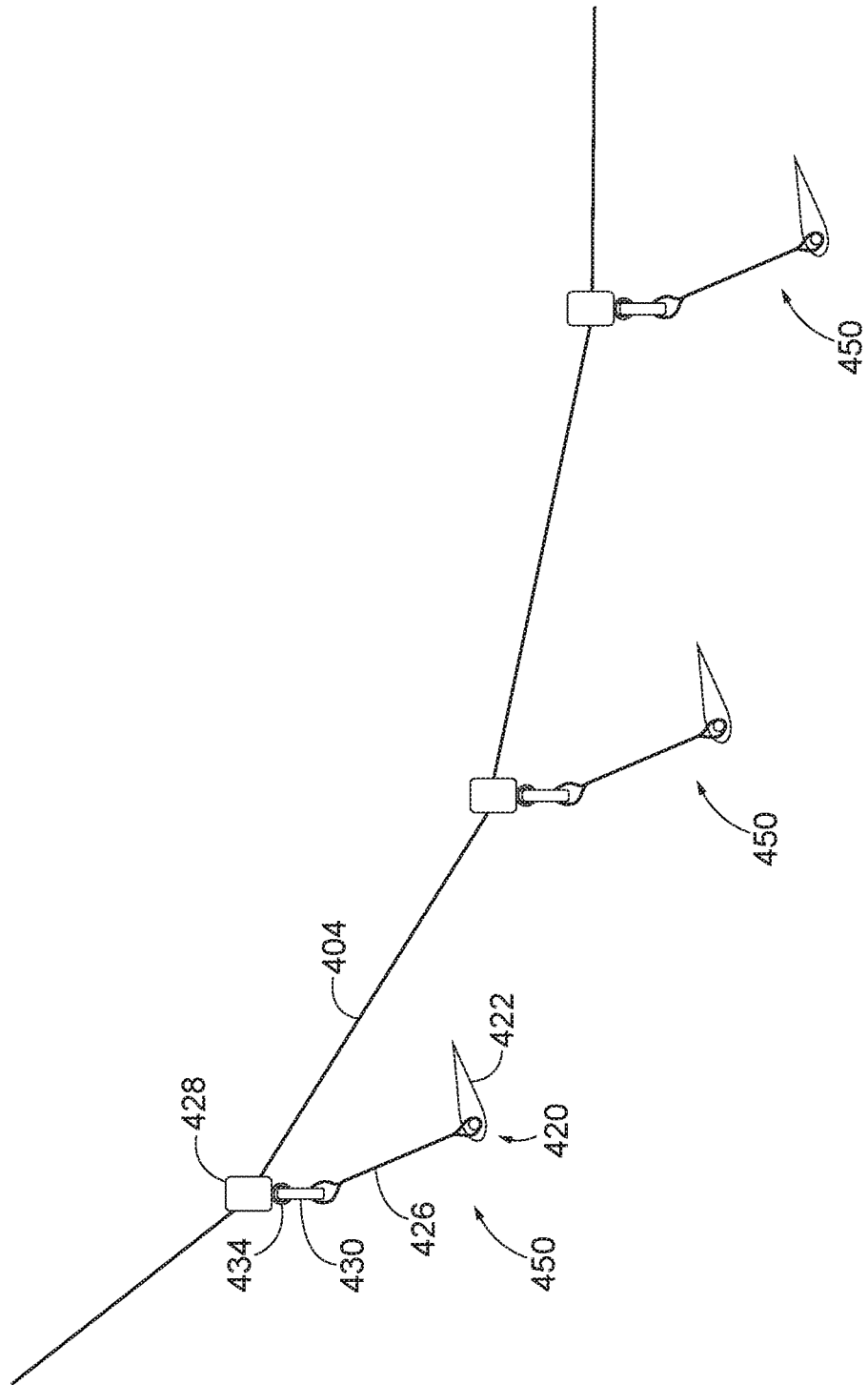
FIG. 14 is port side elevation view of a schematic illustration of a series of ribbon-foil depressor arrays mounted in fixed positions along a cable.

Another potential application of the ribbon-foil depressor 420 is to depress source umbilical cables 404 by mounting the ribbon-foil depressor 420 on a swing seat 450 as depicted in FIGS. 13A, 13B, and 14. In this case, depressor sections 422 may be installed onto a bar or rigid rod 424, supported at either end by a Y-bridle 426, thereby forming the swing seat 450. In some embodiments, a third cable may be included in the Y-bridle 426 to attach to a midpoint of the rigid rod 424. As shown in FIG. 13A, two depressor sections 422 are threaded onto the rigid rod 424, which is suspended from a cable connector 428 by three cables forming the Y-bridle 426. The cables of the Y-bridle 426 may connect to a shackle 430 pivotably attached to the cable connector 428, as shown in FIG. 14. The cable connector 428 may be formed as a clam shell clamp 432 that clamps around the umbilical cable 404. An eye 434 may be mounted (e.g., by a weld joint) to a bottom of the clamp 432 through which the bolt 436 of the shackle 430 may be fitted. In some embodiments, a bend restrictor (e.g., a Cumberland grip) (not shown) may be placed around the umbilical cable 404 at a desired attachment location and the clamp 432 may be seated around the bend restrictor in order to protect the umbilical cable 404 and provide a compression surface for the clamp 432 to affix against. A number of ribbon-foil depressors 420 mounted on swing seats 450 may thus be deployed at discrete, fixed locations along the length of the umbilical cable 404.

In the case of the spur line application, shown in FIGS. 3 and 6, the aspect ratio of the depressor sections of the ribbon-foil depressor 120, 220 can be as high as 100-to-1 or even up to 1000-to-1. In the case of the ribbon-foil depressors 420 mounted on swing seats 450 as shown in FIGS. 13A, 13B, and 14, the aspect ratio may be as low as 5-to-1. However, this is still an improvement over typical depressors with aspect ratios as low as 1-to-1. As mentioned above, the aspect ratio of the foil shape of the depressor sections 422 is a critical factor in determining the lift-to-drag efficiency of the depressor sections 422 and of the ribbon-foil depressor 420 as a whole.

Figure 15:
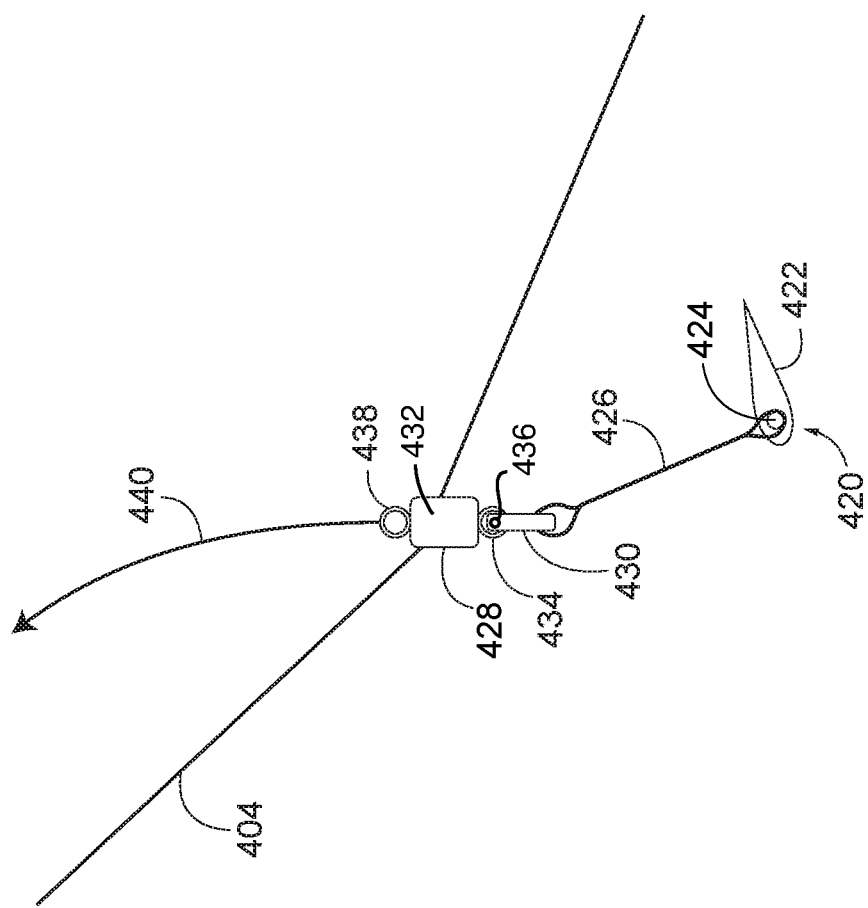
FIG. 15 is port side elevation view of a schematic illustration of a ribbon-foil depressor array in a variable position mount along a cable.

In an alternate embodiment shown in FIG. 15, ribbon-foil depressors 420 mounted on swing seats 450 may be adjustably mounted to the umbilical cable 404. In this embodiment, a diameter of the clam shell clamp 432 of the cable connector 428 may be larger than the diameter of the umbilical cable 404, thereby allowing the cable connector 428 to slide along the umbilical cable 404. In other embodiments, the cable connector 428 may include a sliding mechanism, e.g., one or more pulleys or bearings configured to roll along or against the umbilical cable 404. The cable connector 428 may be attached at a top connector ring 438 or other mount to a thin tagline 440 extending from a utility winch (not shown) mounted on an aft deck of the marine vessel. The position and depth of the ribbon-foil depressor 420 along the umbilical cable 404 can thus be controlled by adjusting the length of the tagline 440 to change the position of the ribbon-foil depressor 420 along the umbilical cable 404, as shown in FIG. 15.

Figure 16:
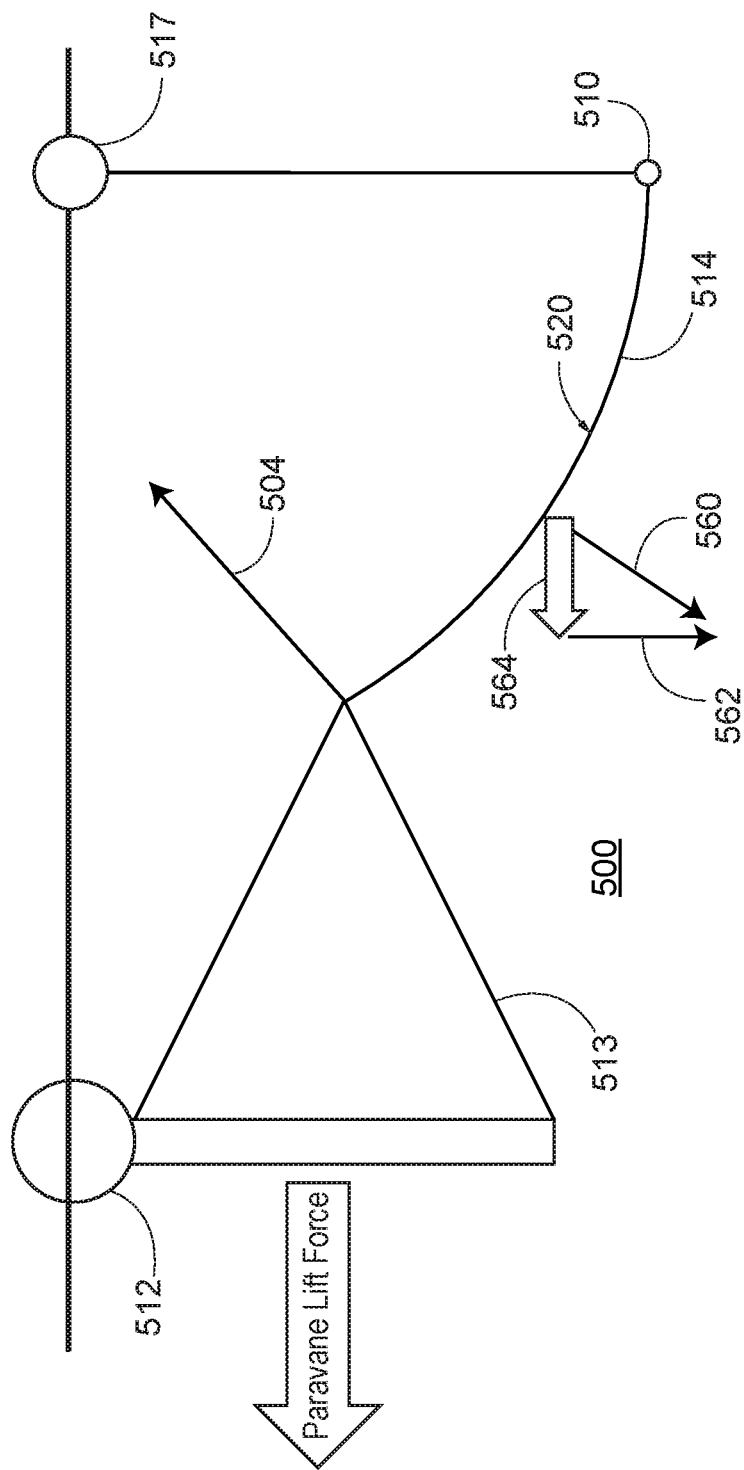
FIG. 16 is an enlarged, partial rear elevation view of a schematic illustration of a port side of a towed seismic array with a system of ribbon-foil depressors provided on the spur line and connected to the port paravane by a bridle.

In addition to the depth control discussed above, a ribbon-foil depressor 520 deployed on the spur line 514 connected to the streamer cable 510 below the surface float 517 may also provide "lift assist" to the paravanes 512 attached by a bridle 513 to the intersection of the tow lines 504 and spur lines 514 as shown in FIG. 16. That is, since the ribbon-foil depressor 520 induces a downward catenary to the spur line 514, as shown in FIG. 16, a first component 562 of the lift force 560 acts downward as discussed above, but a second component 564 of the lift force 560 also acts horizontally (i.e. outboard). This horizontal "lift assist" of the second component 564 provided by the ribbon-foil depressor 520 means that the existing standard paravanes 512 will now be able to spread the seismic array 500 wider than previously possible. Alternatively, the configuration including the ribbon-foil depressor 520 on the spur line 514 may achieve the same spread but at a shorter offset behind the marine vessel towing the array 500. In another implementation, the same spread and offset may be achieved, but a more efficient setting for the bridle 513 attaching the paravanes 512 may be used and hence reduce fuel consumption of the marine vessel.

In addition to the use of a series of depressor sections on spur lines to achieve depression forces to submerge streamer heads down to desired depths for seismic arrays, the ribbon-foil depressor may provide a number of other features and advantages.

The ribbon-foil depressor can readily be installed on existing in-water equipment, such as, for example, by threading the individual depressor sections onto existing spur lines between paravanes and outboard streamer cable heads. Ribbon-foil depressors may also be installed on numerous other existing ropes or rods, such as, for example, on the standard spreader bars of the dual gun clusters used for seismic sources.

The ribbon-foil depressor can be deployed over the side of the marine vessel, or down the gun chute, and will then self-orient and generate lift without operator intervention. Handling, deployment, and recovery operations are essentially hands-free with no special davits or dedicated winches or cranes required. It is also compact and can be easily and efficiently stowed on the vessel when onboard.

The ribbon-foil depressor offers high aspect ratios and high lift-to-drag efficiency. The ribbon-foil depressor offers a high degree of flexibility in terms of the number of choices available, including pivot location, camber, chord length, and tail fin size and angle, to selectively adjust the downforce to suit operational requirements and specifications. Lift is also adjustable by using a dual rope embodiment or providing a high buoyancy material in the aft tubular conduit.

Ribbon-foil depressors applied to umbilicals or other similar type cables can also be scaled by how many are deployed, for example, by daisy-chaining depressor sections at intervals along the cable All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:
1. A foil for a towed cable comprising:
a body with a foil shape having a leading edge and a trailing edge and further defining:
  a first surface extending between the leading edge and the trailing edge configured to provide lift;
  a second surface opposed the first surface extending between the leading edge and the trailing edge;

a first lateral side that extends between a first lateral edge of the first surface, a first lateral edge of the second surface, the leading edge, and the trailing edge; and a second lateral side that extends between a second lateral edge of the first surface, a second lateral edge of the second surface, the leading edge, and the trailing edge;

a first conduit defined within a forward half of the body adjacent to the leading edge, open to each of the first and second lateral sides, and configured to receive a cable therethrough;

a second conduit defined within the forward half of the body, aft of and parallel to the first conduit, open to each of the first and second lateral sides, and configured to receive a cable therethrough;

a third conduit defined within an aft half of the body; and a fourth conduit open to each of the first and second lateral sides and is positioned between the first conduit and the second conduit.

2. The foil of claim 1, wherein the third conduit is configured to receive a cable therethrough.

3. The foil of claim 1, wherein the third conduit is filled with buoyant material.

4. The foil of claim 3, wherein the buoyant material is more buoyant than the body.

5. The foil of claim 4, wherein the buoyant material is syntactic foam.

6. The foil of claim 1, wherein the body is made from near-neutral buoyancy material.

7. The foil of claim 1, wherein the body is negatively buoyant.

8. The foil of claim 7, wherein the body is made from cast polyurethane.

9. The foil of claim 1, wherein the fourth conduit is parallel to the first conduit and the second conduit.

10. The foil of claim 1, wherein the first and second conduits are positioned within a forward half of a length of the foil between the leading edge and the trailing edge.

11. The foil of claim 1, wherein the second surface is flatter than the first surface.

12. The foil of claim 1, wherein the first surface is cambered.

13. A foil for a towed cable comprising;
a body with a foil shape having a leading edge and a trailing edge and further defining:
a first surface extending between the leading edge and the trailing edge configured to provide a lift;
a second surface opposed to the first surface extending between the leading edge and the trailing edge;
a first lateral side that extends between a first lateral edge of the first surface, a first lateral edge of the second surface, the leading edge, and the trailing edge; and
a second lateral side that extends between a second lateral edge of the first surface, a second lateral edge of the second surface, the leading edge, and the trailing edge;
a first conduit defined within the body, wherein the first conduit extends laterally within the body adjacent to the leading edge, is open to each of the first and second lateral sides, and is configured to receive a cable therethrough; and
a second conduit defined within the body and filled with buoyant material.

14. The foil of claim 13, wherein the buoyant material is more buoyant than the body.

15. The foil of claim 13, wherein the body is made from near-neutral buoyancy material.

16. The foil of claim 13, wherein the body is negatively buoyant.

17. The foil of claim 13, wherein the second conduit extends laterally within the body, is positioned aft of and parallel to the first conduit, and opens to each of the first and second lateral sides.

18. The foil of claim 13, wherein the second conduit is positioned in an aft section of the foil.

19. The foil of claim 13 further comprising a third conduit configured to receive a cable therethrough, wherein the third conduit is defined within the body and extends laterally therein aft of and parallel to the first conduit, and opens to each of the first and second lateral sides.

20. The foil of claim 19, wherein the second conduit is positioned aft of the first and third conduits.

* * * * *